R. F. PACK.
FLUID PRESSURE MOTOR.
APPLICATION FILED DEC. 6, 1919.
1,355,688.
Patented Oct. 12, 1920.
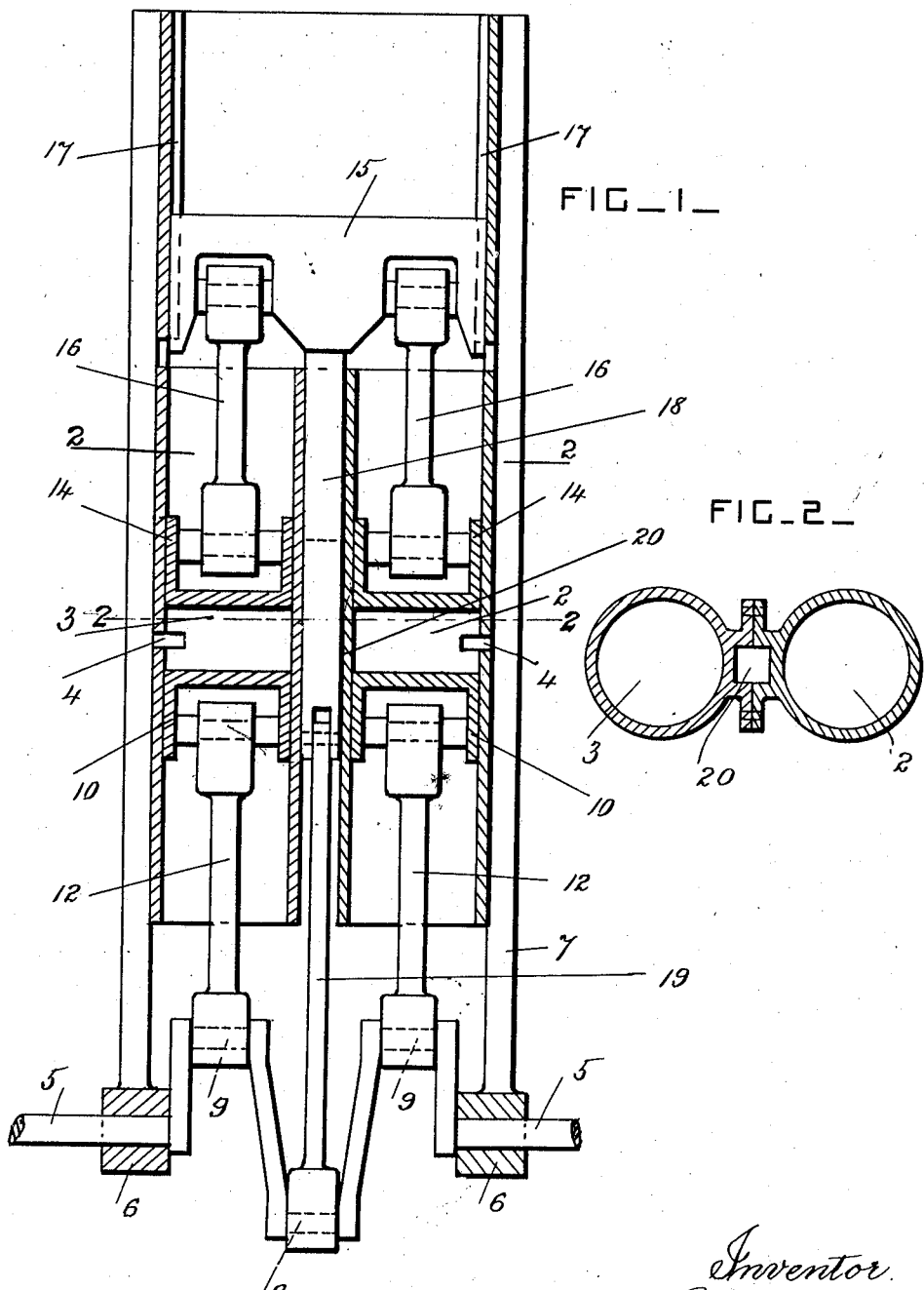

UNITED STATES PATENT OFFICE.

RUFUS F. PACK, OF CEDAR VALE, KANSAS.

FLUID-PRESSURE MOTOR.

1,355,688.  Specification of Letters Patent.  Patented Oct. 12, 1920.

Application filed December 6, 1919. Serial No. 343,015.

*To all whom it may concern:*

Be it known that I, RUFUS F. PACK, a citizen of the United States, residing at Cedar Vale, in the county of Chautauqua and State of Kansas, have invented certain new and useful Improvements in Fluid-Pressure Motors, of which the following is a specification.

This invention relates to motors for driving machinery which are operated by the pressure of a fluid such as formed by the combustible charge of an internal combustion engine, or operated by steam or water; and it consists in the novel construction and combination of the parts hereinafter fully described and claimed whereby the strains are evenly distributed on the crankshaft and the motor is enabled to act in a very effective manner.

In the drawings, Figure 1 is a plan view of portions of a motor constructed according to this invention, showing the cylinders in section. Fig. 2 is a cross-section through the cylinders taken on line 2—2 in Fig. 1.

Two similar cylinders 2 and 3 are provided, and are arranged parallel to each other. Each cylinder has a port 4 at the middle part of its length. This port serves for the inlet and outlet of the fluid which operates the engine, and suitable valve mechanism (not shown) is provided for controlling the said ports. Suitable igniters are also provided when the motor is an internal combustion engine.

A crankshaft 5 is provided, and is journaled in stationary bearings 6 preferably formed on a frame 7 to which the cylinders are also secured. The crankshaft has three cranks arranged adjacent to each other and between the two crankshaft bearings 6. The center crank has its crank-pin 8 arranged on the opposite side of the axis of the crankshaft from the crank-pins 9 of the side cranks.

The cylinders are provided with similar front pistons 10, which are connected to the side crank-pins 9 by connecting-rods 12. The cylinders have also rear pistons 14 which are connected to a crosshead 15 by rods 16.

The crosshead is arranged at the opposite end of the cylinders from the crankshaft, and it is slidable in guides 17 on the frame, the crosshead is connected with the center crank-pin 8 by a bar 18 which is arranged in a guide 20 formed between the two cylinders, and a connecting-rod 19. The two cylinders are formed separately from each other. One half of the guide 20 is formed as a guide groove in the side portion of one cylinder, and the other half is formed as a guide groove in the side portion of the other cylinder, and the guide 20 is arranged between the centers of the two cylinders when secured together.

When pressure fluid is admitted simultaneously to the cylinders, or inflammable charges are ignited between their pistons, the pistons are forced in opposite directions, and the crankshaft is revolved. A suitable fly-wheel (not shown) is provided, and the arrangement and connection of the parts is such as to equalize and distribute the strains on the crankshaft and enable it to run smoothly in its bearings.

What I claim is:

In a fluid pressure motor, a frame having bearings at one end, a guide at the other end of the frame, two cylinders secured together and arranged between the bearings and guide, said cylinders having meeting guide grooves in their adjacent side portions, between their centers, a crankshaft journaled in the said bearings and having three crank-pins, the center crank-pin being arranged on the opposite side of the shaft from the side crank-pins, front pistons slidable in the two cylinders and operatively connected with the side crank-pins, rear pistons also slidable in the two cylinders, a crosshead slidable in the said guide and operatively connected with the rear pistons, a bar secured to the crosshead and slidable in the said guide grooves, and a connecting-rod between the said bar and the center crank-pin.

In testimony whereof I have affixed my signature.

RUFUS F. PACK.